(12) United States Patent
Li

(10) Patent No.: US 12,400,450 B2
(45) Date of Patent: Aug. 26, 2025

(54) METHOD AND DEVICE FOR DETERMINING SMOKE

(71) Applicant: CHINA SCIENCE INTELLICLOUD TECHNOLOGY CO., LTD., Hefei (CN)

(72) Inventor: Yuan Li, Hefei (CN)

(73) Assignee: CHINA SCIENCE INTELLICLOUD TECHNOLOGY CO., LTD., Hefei (CN)

( * ) Notice: Subject to any disclaimer, the term of this patent is extended or adjusted under 35 U.S.C. 154(b) by 823 days.

(21) Appl. No.: 17/763,194

(22) PCT Filed: Sep. 23, 2020

(86) PCT No.: PCT/CN2020/117128
§ 371 (c)(1),
(2) Date: Mar. 23, 2022

(87) PCT Pub. No.: WO2021/057790
PCT Pub. Date: Apr. 1, 2021

(65) Prior Publication Data
US 2022/0292829 A1 Sep. 15, 2022

(30) Foreign Application Priority Data
Sep. 24, 2019 (CN) .......................... 201910904767.X

(51) Int. Cl.
*G06V 20/40* (2022.01)
*G06T 7/215* (2017.01)
(Continued)

(52) U.S. Cl.
CPC .............. *G06V 20/49* (2022.01); *G06T 7/215* (2017.01); *G06V 20/41* (2022.01); *G06V 20/52* (2022.01);
(Continued)

(58) Field of Classification Search
CPC ........ G06V 20/49; G06V 20/41; G06V 20/52; G06V 10/145; G06V 10/62; G06T 7/215;
(Continued)

(56) References Cited

U.S. PATENT DOCUMENTS

2007/0064980 A1\* 3/2007 Knox ..................... G01N 21/85
382/128
2014/0022547 A1\* 1/2014 Knox ................... G08B 29/043
356/338
(Continued)

FOREIGN PATENT DOCUMENTS

CN 1427253 A 7/2003
CN 101099186 A 1/2008
(Continued)

*Primary Examiner* — Bobbak Safaipour
(74) *Attorney, Agent, or Firm* — Bayramoglu Law Offices LLC

(57) ABSTRACT

A method, an apparatus, and a device for determining smoke, and a computer-readable storage medium are provided. The method includes: obtaining a video image of a photographed region by using a camera apparatus, where the photographed region is irradiated by a laser with a predetermined wave band emitted by a laser unit, and the camera apparatus is configured with a filter allowing the laser with the predetermined wave band to pass through; determining, based on a plurality of frames of images in the video image, a motion region in the plurality of frames of images; and determining whether the photographed region includes smoke based on a feature of the motion region.

18 Claims, 6 Drawing Sheets

(51) Int. Cl.
*G06V 20/52* (2022.01)
*G08B 17/10* (2006.01)
(52) U.S. Cl.
CPC .... *G08B 17/10* (2013.01); *G06T 2207/20081* (2013.01)
(58) Field of Classification Search
CPC .......... G06T 2207/20081; G08B 17/10; G08B 17/125
See application file for complete search history.

(56) References Cited

U.S. PATENT DOCUMENTS

2014/0300750 A1* 10/2014 Nagamune ................ G01J 3/32
 348/164
2016/0307424 A1* 10/2016 Mills ...................... H04N 7/183
2020/0202695 A1* 6/2020 Ding ....................... G06T 7/251

FOREIGN PATENT DOCUMENTS

| CN | 101395643 A | 3/2009 |
| CN | 101751744 A | 6/2010 |
| CN | 101908141 A | 12/2010 |
| CN | 101916372 A | 12/2010 |
| CN | 103606241 A | 2/2014 |
| CN | 104050478 A | 9/2014 |
| CN | 104954744 A | 9/2015 |
| EP | 1271444 A1 | 1/2003 |

\* cited by examiner

METHOD AND DEVICE FOR DETERMINING SMOKE

CROSS REFERENCE TO THE RELATED APPLICATIONS

This application is the national phase entry of International Application No. PCT/CN2020/117128, filed on Sep. 23, 2020, which is based upon and claims priority to Chinese Patent Application No. 201910904767.X, filed on Sep. 24, 2019, the entire contents of which are incorporated herein by reference.

TECHNICAL FIELD

The present disclosure relates to smoke and fire and/or dust alarms, and more specifically, to a method, an apparatus, and a device for determining smoke, and a computer-readable storage medium.

BACKGROUND

In the conventional solutions for a smoke alarm, the smoke alarm is triggered by an indoor smoke detector or temperature sensor. For example, a smoke alarm is generated when the indoor smoke detector mounted on the roof detects smoke floating into the smoke detector or when the indoor temperature sensor detects that a room temperature exceeds an alarm threshold.

In the conventional solutions for smoke alarm, the smoke detector and the temperature sensor have relatively small detection/sensing ranges, making it difficult to effectively detect an ignition point far away from them and generate an alarm. For example, the smoke detector can trigger an alarm device to generate an alarm only when sensing smoke floating into the smoke detector. Therefore, in case of a large monitored area or outdoor open space, smoke generated by flame diffuses with the flow of air. In this case, the smoke cannot immediately float into the smoke detector, the smoke detector thus cannot trigger an alarm in a timely manner, and sometimes the smoke detector cannot even detect smoke (for example, in the outdoor open space). In addition, there is often the case of a false alarm in the conventional solutions for smoke alarm. For example, when the temperature sensor senses the heating of other surrounding objects (such as electrical equipment, or electric welding on the construction site of industrial and mining enterprises), a false alarm is generated.

Therefore, according to the above conventional solutions for smoke alarm, it is difficult to perform smoke alarming for outdoor or indoor scenarios with a relatively large space in a timely manner with high reliability, which is significantly disadvantageous for fire prevention.

SUMMARY

According to a first aspect of the present disclosure, a method for smoke alarm is provided. The method includes: obtaining a video image of a photographed region by using a camera apparatus, where the photographed region is irradiated by a laser with a predetermined wave band emitted by a laser unit, and the camera apparatus is configured with a filter allowing the laser with the predetermined wave band to pass through; determining, based on a plurality of frames of images in the video image, a motion region in the plurality of frames of images; and determining whether the photographed region includes smoke based on a feature of the motion region.

According to a second aspect of the present disclosure, an apparatus for smoke alarm is further provided. The device includes: a memory, configured to store one or more programs; and a processing unit, coupled to the memory and configured to execute the one or more programs to allow a system to perform the method according to the first aspect of the present disclosure.

According to a third aspect of the present disclosure, a non-transient computer-readable storage medium is provided. The non-transient computer-readable storage medium stores machine-executable instructions, where the machine-executable instructions, when being executed, allow a machine to perform the method according to the first aspect of the present disclosure.

According to a fourth aspect, a device for smoke alarm is further provided. The device includes: a laser unit, configured to emit a laser beam with a predetermined wave band, to irradiate a photographed region; a camera apparatus, configured to obtain a video image of a photographed region, where the camera apparatus is configured with a filter allowing the laser with the predetermined wave band to pass through; and a processing unit, configured to determine, based on a plurality of frames of images in the video image, a motion region in the plurality of frames of images and determine whether the photographed region includes smoke based on a feature of the motion region.

The content of summary is provided to introduce the selection of concepts in a simplified form, which will be further described in specific implementations below. The summary part is not intended to identify key features or main features of the present disclosure and is not intended to limit the scope of the present disclosure.

BRIEF DESCRIPTION OF THE DRAWINGS

Through a more detailed description of exemplary embodiments of the present disclosure in combination with the drawings, the above and other objectives, features, and advantages of the present disclosure are more obvious. In the exemplary embodiments of the present disclosure, same reference numerals generally represent same components.

In the accompanying drawings, same or corresponding numerals represent same or corresponding to parts.

DETAILED DESCRIPTION OF THE EMBODIMENTS

Figure 1:
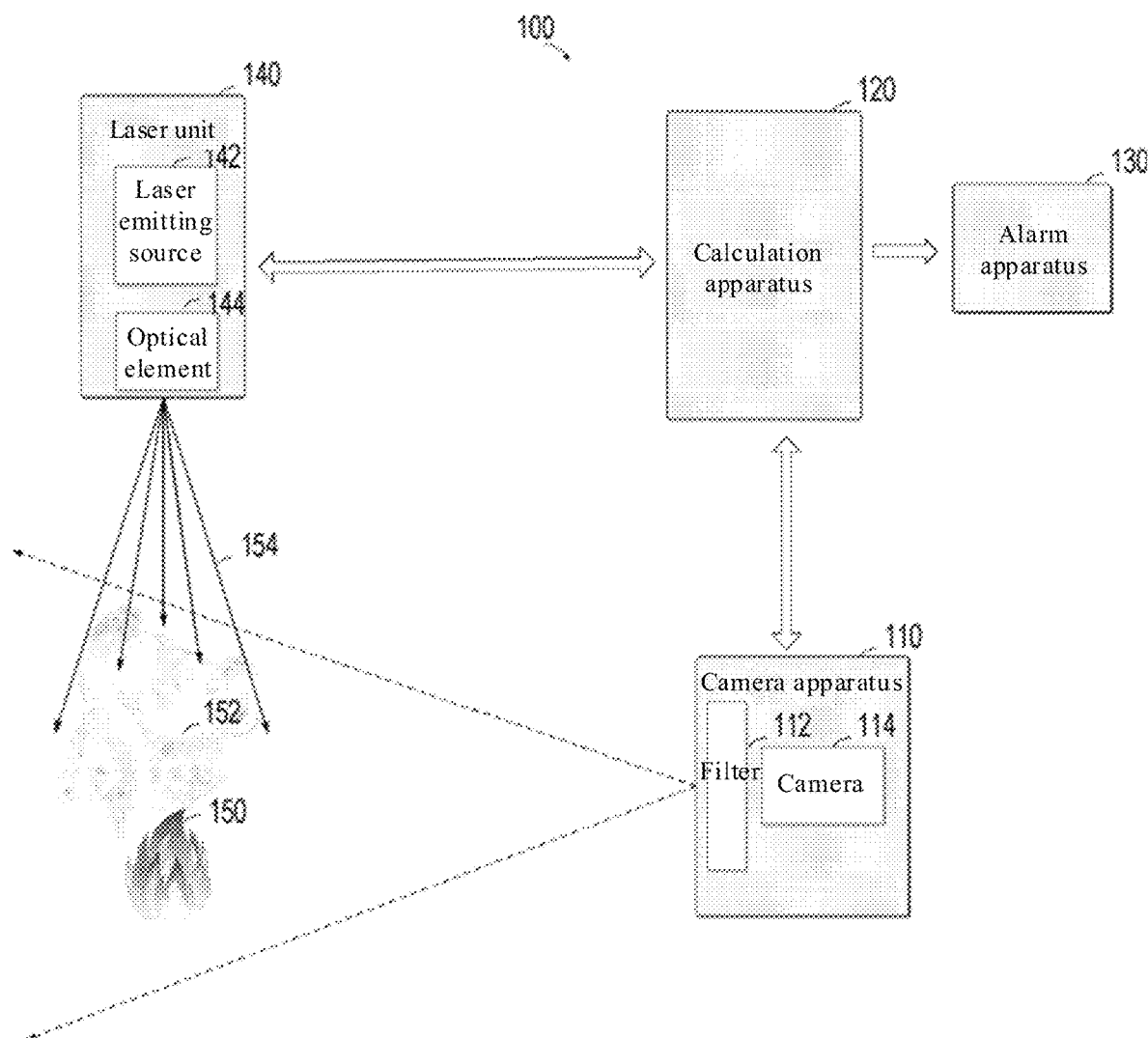
FIG. 1 is an architecture diagram of a system 100 for smoke alarm according to an embodiment of the present disclosure.

Exemplary embodiments of the present disclosure will be described below in more detail with reference to the accompanying drawings. The embodiments of the present disclosure will be described below in more detail with reference to the accompanying drawings. Although some embodiments of the present disclosure are shown in the accompanying drawings, it should be understood that the present disclosure can be implemented in various form and should not be construed as being limited to the embodiments illustrated herein. On the contrary, these embodiments are provided to help more thoroughly and completely understand the present disclosure. It should be understood that the accompanying drawings and the embodiments of the present disclosure are only used as examples, and are not intended to limit the protection scope of the present disclosure.

In the description of the embodiments of the present disclosure, the term "include" and similar terms should be understood as open inclusion, that is, "including but not limited to". The term "based on" should be understood as "at least partially based on". The term "an embodiment" or "this embodiment" should be understood as "at least one embodiment". Other explicit and implicit definitions may also be included below.

As described above, in a conventional solution for smoke alarm, a smoke detector triggers an alarm apparatus to give an alarm only when sensing a specific concentration of smoke floating inside the smoke detector. Therefore, when a monitored space is relatively large or is an outdoor open space, the smoke detector requires a relatively long response time to detect smoke and even sometimes fails to detect the smoke, which is not conducive to fire detection and prevention.

An exemplary embodiment of the present disclosure provides a solution for determining smoke. In this solution, a video image of a photographed region is obtained by using a camera apparatus. The photographed region is irradiated by a laser with a predetermined wave band emitted by a laser unit and the camera apparatus is configured with a filter allowing the laser with the predetermined wave band to pass through; based on a plurality of frames of images in the video image, a motion region in the plurality of frames of images is determined; and whether the photographed region includes smoke is determined based on a feature of the motion region.

In some embodiments, the solution further includes: generating an alarm signal in response to determining that the photographed region includes the smoke, such that an alarm apparatus gives an alarm.

In the solution, a camera apparatus provided with a filter obtains a video image of a photographed region irradiated by a laser with a predetermined wave band, floating smoke particles generated at an ignition point can generate a cloud-shaped highlight band under irradiation of the laser with the predetermined wave band during a fire, and only a visual feature within a predetermined laser wavelength band is acquired by using the filter, such that other visual interference is well shielded. Because the floating smoke particles generated at the ignition point have a Brownian movement characteristic, the cloud-shaped highlight band also has the Brownian movement characteristic. Therefore, a motion region in a plurality of frames of images of the acquired video image is recognized, and whether the photographed region includes smoke is determined based on a feature of the motion region, such that existence of the cloud-shaped highlight band can be recognized with high reliability, and the smoke and fire alarm is performed in time with high reliability for an outdoor scenario or an indoor scenario with a relatively large space without waiting for smoke to float to a position of the smoke sensor.

FIG. 1 is an architecture diagram of a system 100 for smoke alarm according to an embodiment of the present disclosure. As shown in FIG. 1, the system 100 includes a camera apparatus 110, a calculation apparatus 120 (for example, an apparatus for smoke alarm), an alarm apparatus 130, and a laser unit 140. The camera apparatus 110, the alarm apparatus 130, and the laser unit 140 are respectively connected to the calculation apparatus 120 (or by using a network) for signal interaction. In some embodiments, the camera apparatus 110, the calculation apparatus 120, the alarm apparatus 130, and the laser unit 140 may be integrated in one device. In the device, the calculation apparatus 120 is, for example, one or more processing units. In some embodiments, the camera apparatus 110, the calculation apparatus 120, the alarm apparatus 130, and the laser unit 140 may be disposed in a distributed manner. For example, the calculation apparatus 120 may be a server. The camera apparatus 110 and the laser unit 140 may be respectively disposed on one side or two sides of a photographed region. For example, a predetermined angle (for example,) 90° is set between a direction from the camera apparatus 110 to a predetermined position of the photographed region and a direction from the laser unit 140 to the predetermined position of the photographed region.

The laser unit 140 is configured to emit a laser 154 (for example, a laser beam) with a predetermined wave band, to irradiate the photographed region. In some embodiments, the laser unit 140 includes a laser emitting source 142 and an optical element 144. The laser emitting source 142 is configured to emit a laser beam with a single wavelength (the laser beam with the single wavelength is, for example, invisible light). In some embodiments, the laser beam with the single wavelength is, for example, an infrared ray. In some embodiments, the laser emitting source 142 is, for example, a laser emitting point array. The optical element 144 is configured to allow the laser beam with the single wavelength to be emitted at a predetermined divergence angle. In some embodiments, the optical element 144 is, for example, a cylindrical lens, and is configured to allow the laser unit 140 to emit the laser 154 in a fan-shaped plane manner.

The camera apparatus 110 is configured to obtain a video image of a photographed region. The camera apparatus 110 is configured with a filter 112 allowing to the laser with the predetermined wave band to pass through. In some embodiments, the camera apparatus 110 includes, for example, at least one or more cameras 114 and the filter 112. In some embodiments, the filter 112 is a narrow band filter of which a pass band center wavelength is a single wavelength. A pass band of the narrow band filter is relatively narrow and is, for example, 5% or less of a center wavelength value (that is, the pass band center wavelength). In some embodiments, the narrow band filter is configured to, for example, allow visible light to be filtered completely and allow only an infrared ray (for example, light near a wavelength of 850 nm) that needs to be acquired to pass through. The infrared ray near the wavelength of 850 nm is invisible light. The deployment of the invisible light may reduce impact caused to a scene. By using the infrared light, the system 100 can not only be applicable to a scene that is not suitable for visible light, but also help to avoid the interference from other visible light in the scene to recognition.

The calculation apparatus 120 is configured to determine, based on a plurality of frames of images of the video image obtained by using the camera apparatus 110, a motion region in the plurality of frames of images and determine whether the photographed region includes smoke based on a feature of the motion region. The calculation apparatus 120 may be further configured to generate an alarm signal when determining that the photographed region includes the smoke, such that the alarm apparatus 130 gives an alarm when detecting the alarm signal. The calculation apparatus 120 may be provided with one or more processing units, for example, including dedicated processing units such as a general processing unit (GPU), a field programmable gate array (FPGA), and an applicable-specific integrated circuit (ASIC) and a general-purpose processing unit such as a central processing unit (CPU). In addition, one or more virtual machines may alternatively be run on the calculation apparatus 120.

The alarm apparatus 130 is configured to give an alarm in response to detecting the alarm signal of the calculation apparatus 120 (for example, the processing unit). The alarm signal is generated by the calculation apparatus 120 in response to determining that the photographed region includes the smoke. In some embodiments, the alarm apparatus 130 is, for example, a sound-and-optic alarm apparatus.

Figure 2:
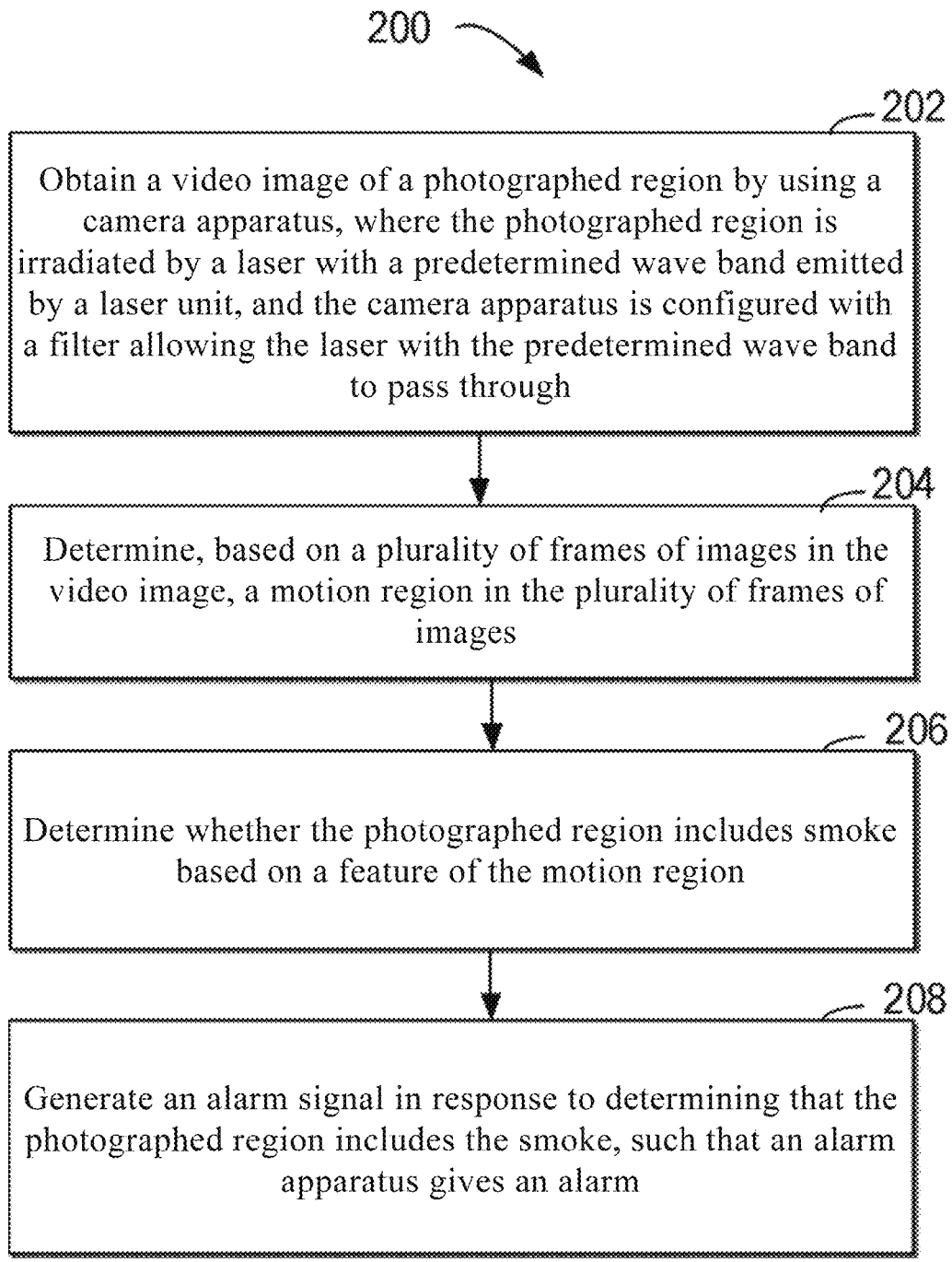
FIG. 2 is a flowchart of a method 200 for smoke alarm according to an embodiment of the present disclosure.

A method for determining smoke is described below with reference to FIG. 2. FIG. 2 is a flowchart of a method 200 for smoke alarm according to an embodiment of the present disclosure. In FIG. 2, each action is, for example, performed by the calculation apparatus 120 in the system 100 for smoke alarm in FIG. 1. For ease of discussion, in general, the method 200 is described by using the calculation apparatus 120 in FIG. 1 as an example. It should be understood that the method 200 may further include additional actions that are not shown and/or the shown actions may be omitted, and the scope of the present disclosure is not limited in this aspect.

In a block 202, a calculation apparatus 120 obtains a video image of a photographed region by using a camera apparatus 110, where the photographed region is irradiated by a laser beam 154 with a predetermined wave band emitted by a laser unit 140, and the camera apparatus 110 is configured with a filter 112 allowing to the laser beam with the predetermined wave band to pass through. In some embodiments, the photographed region is a scene that requires monitoring smoke and fire or dust and giving an alarm. The scene is included in a photography field of view of the camera apparatus 110. As shown in FIG. 1, at the beginning of occurrence of an ignition point 150 in the photographed region, a large amount of smoke 152 is generated at the ignition point 150. The smoke 152 is formed by floating smoke particles. When the laser beam 154 with the predetermined wave band is irradiated on the floating smoke particles generated at the ignition point, it may be understood that if the smoke particle is many times greater than a wavelength of an incident laser, light is reflected, and if the smoke particle is less than the wavelength of the incident laser (for example, when a radius of the smoke particle suspended in the air is less than 850 nm of the wavelength of the laser with the predetermined wave band), light is scattered. Therefore, when the laser with the predetermined wave band is irradiated on the floating smoke particles generated at the ignition point, a cloud-shaped highlight band is formed under the action of scattering and reflection of the laser. Visual feature acquisition is performed on the laser with the predetermined wave band by using the camera apparatus 114 configured with the filter 112 allowing the laser with the predetermined wave band to pass through, such that impact of visual interference factors (for example, environment light and a background change) can be well shielded, and the reliability of determining whether the photographed region includes the ignition point 150 can be significantly improved.

For a relative position between the camera apparatus 110 and the laser unit 140, in some embodiments, a predetermined angle is formed between a direction from the camera apparatus 110 to a predetermined position of the photographed region and a direction from the laser unit 140 to the predetermined position of the photographed region, and the laser beam 154 has a predetermined divergence angle. The predetermined angle may be set to different angles, for example, approximately 60° or approximately 90°. In some embodiments, the camera apparatus 110 and the laser unit 140 may be respectively disposed on two sides of the photographed region (that is, the laser unit 140 and the camera apparatus 110 are disposed opposite to each other), but need to be staggered in height, to prevent the laser emitted by the laser unit 140 from being directly irradiated on the camera apparatus 110. Therefore, a case that the video image obtained by using the camera apparatus 110 is abnormal due to overexposure is avoided.

In some embodiments, the laser beam 154 with the predetermined wave band may be a pulse laser beam with a single wavelength. In some embodiments, the laser beam with the predetermined wave band may be an infrared beam, for example, an infrared beam with a wavelength being about 850 nm. An infrared ray is invisible light and has a stronger capability of penetrating cloud than visible light. Therefore, visual interference caused by the visible light can be shielded by using the infrared ray, and a feature of the cloud-shaped highlight band can be significantly enhanced. Even when the human eye cannot recognize smoke, the presence of the smoke can be indicated in advance by using the cloud-shaped highlight band. In some embodiments, the laser beam with the predetermined wave band is a pulse laser beam with a single wavelength. The single wavelength belongs to the predetermined wave band. A pulse frequency of the pulse laser beam is greater than a sampling frequency of the camera apparatus, and the filter is a narrow band filter of which a center wavelength is the single wavelength. A power and a continuous irradiation duration of the laser can be effectively reduced by using the pulse laser beam with the single wavelength (for example, causing the continuous irradiation duration to not exceed 400 ms), such that a range of an applicable scenario of the system 100 can be enlarged. In some embodiments, a wavelength and a maximum output laser power of the laser unit 140 meet a requirement of a class 1 laser without harming to people.

In some embodiments, the filter may be a narrow band filter. A characteristic of the filter is to allow an optical signal with a predetermined wave band to pass through, and prevent an optical signal deviating from the wave band. A pass band of the narrow band filter is relatively narrow and is, for example, 5% or less of a center wavelength value (that is, the pass band center wavelength). The pass band of the narrow band filter is set to adapt to a wave band of the laser beam emitted by the laser unit. For example, when the emitted laser is an infrared ray with a wavelength of about 850 nm, for example, 850 nm is selected for a pass band center wavelength of the narrow band filter. In the solution, a filter is configured as a narrow band filter with a pass band center wavelength of a single wavelength, such that other visual interference can be well shielded. The reliability of smoke recognition is further improved.

In a block 204, based on a plurality of frames of images in the video image, a motion region in the plurality of frames of images is determined. There are a plurality of manners of determining the motion region. For example, the calculation apparatus 120 may determine a motion region in a plurality of frames of images based on a background modeling algorithm. The background is a still object in the photographed region. Because the camera apparatus 110 is still, each pixel of each image frame in the video image of the photographed region obtained by using the camera apparatus 110 has a corresponding background value. Within a period of time, the background value is fixed. In the photographed region, a large amount of smoke 152 generated at the ignition point 150 is moving. Therefore, the cloud-shaped highlight band is formed by the laser beam 154 with the predetermined wave band irradiating on the floating smoke particles is also moving. Therefore, a background of the photographed region may be first extracted, a motion region in a plurality of frames of images of an acquired video image is determined based on background modeling, and then whether the determined motion region is associated with a cloud-shaped highlight band is determined.

There may be a plurality of background modeling manners. In some embodiments, the calculation apparatus 120 may determine the motion region by using any algorithm model of an inter-frame differential model, a background statistical model, a code book-based background model, or a Gaussian-based background model. An exemplary manner of determining a motion region is described below in detail with reference to FIG. 3. Details are not described herein again. All pixels in a plurality of sequence image frames can be divided into background pixels and motion region (that is, foreground) pixels through background modeling, such that the motion region can be simply determined.

In a block 206, the calculation apparatus 120 determines whether the photographed region includes smoke based on a feature of the motion region. Whether the photographed region includes the smoke may be determined in a plurality of manners. For example, because the floating smoke particles generated at the ignition point 150 perform Brownian movement in the air, the cloud-shaped highlight band formed when the laser with the predetermined wave band is irradiated on the floating smoke particles generated at the ignition point also moves all the time. In addition, a motion feature of the cloud-shaped highlight band is different from a feature of a general motion object. Therefore, the calculation apparatus 120 may determine whether the motion region has a feature of smoke motion based on the feature of the motion region. For example, irregular movement of the smoke particles in the air leads to irregular changes of an edge contour and/or an area of the cloud-shaped highlight band. Therefore, in some embodiments, the feature of the motion region is at least associated with a change of at least one of an edge contour and an area of the motion region. For example, the calculation apparatus 120 may determine whether the determined motion region is associated with the cloud-shaped highlight band based on an edge contour feature of the motion region. The edge contour feature includes, for example, at least one of the following: a ratio of a circumference of the edge contour to an area surrounded by the edge contour; and a ratio of a length of the edge contour to a width of the edge contour. That is, whether the photographed region includes the smoke is recognized by determining whether the edge contour feature of the motion region also has the irregularity by using the irregularity of a contour of smoke. For example, if it is determined that the edge contour feature of the motion region also has the irregularity, it is determined that the photographed region includes the smoke.

In some embodiments, the calculation apparatus 120 may also determine whether the photographed region includes the smoke by using a histogram of gradient (an HOG feature). In computer vision and digital image processing, the histogram of gradient is a description operator for detecting an object based on a shape edge feature. Edge information of an image target may be better reflected by using gradient information, and a local appearance and shape of the image are characterized by using a size of a local gradient. For example, the calculation apparatus 120 may calculate and count a histogram of gradient of the image to form the feature of the motion region. Because an appearance and a shape of a local target can be well described by using density distribution in a gradient or edge direction, the feature of the motion region formed by the histogram of gradient can maintain good invariance to the geometric and optical deformation of the image. Further, whether the photographed region includes the smoke can be accurately recognized. In some embodiments, the calculation apparatus 120 may first detect an edge contour of the motion region, then determine each vertical line in the edge contour and calculate an angle feature between the vertical line and a normal line of the edge contour, and form a histogram of gradient based on an association relationship between a quantity of normal lines and angles, to form the feature of the motion region. Further, whether the photographed region includes the smoke is determined based on a change rule of the histogram of gradient of the edge contour. In the solution, determining whether the photographed region includes the smoke based on the histogram of gradient can further reduce the impact of factors such as illumination (for example, sunlight) and a background on a recognition result.

In some embodiments, the calculation apparatus 120 may alternatively determine whether the photographed region includes the smoke by using a support vector machine (SVM)-based two-class classification model. In some embodiments, the calculation apparatus 120 may alternatively determine whether the photographed region includes the smoke by using a deep learning-based classification model. A manner of determining smoke by using a deep learning-based classification model is described below in detail with reference to FIG. 5. Details are not described herein again.

In some embodiments, the method further includes: in a block 208, an alarm signal is generated when the calculation apparatus 120 determines that the photographed region includes the smoke, such that an alarm apparatus gives an alarm. In some embodiments, the alarm apparatus is, for example, a sound-and-optic alarm apparatus.

In the solution, a camera apparatus 110 provided with a filter obtains a video image of a photographed region irradiated by a laser beam 154 with a predetermined wave band, floating smoke particles generated at an ignition point 150 can generate a cloud-shaped highlight band under irradiation of the laser with the predetermined wave band during a fire, and only a visual feature within a predetermined laser wavelength band is acquired by using the filter 112, such that other visual interference is well shielded. Because the floating smoke particles generated at the ignition point 150 have a Brownian movement characteristic, the cloud-shaped highlight band also has a movement characteristic different from a common motion object. Therefore, a motion region in a plurality of frames of images of the acquired video image is recognized, and whether the photographed region includes smoke is determined based on a feature of the motion region, such that the presence of the cloud-shaped highlight band can be recognized with high reliability, the smoke and fire alarm is performed in time with high reliability for an outdoor scenario or an indoor scenario with a relatively large space without waiting for smoke to float to a position of the smoke sensor.

Figure 3:
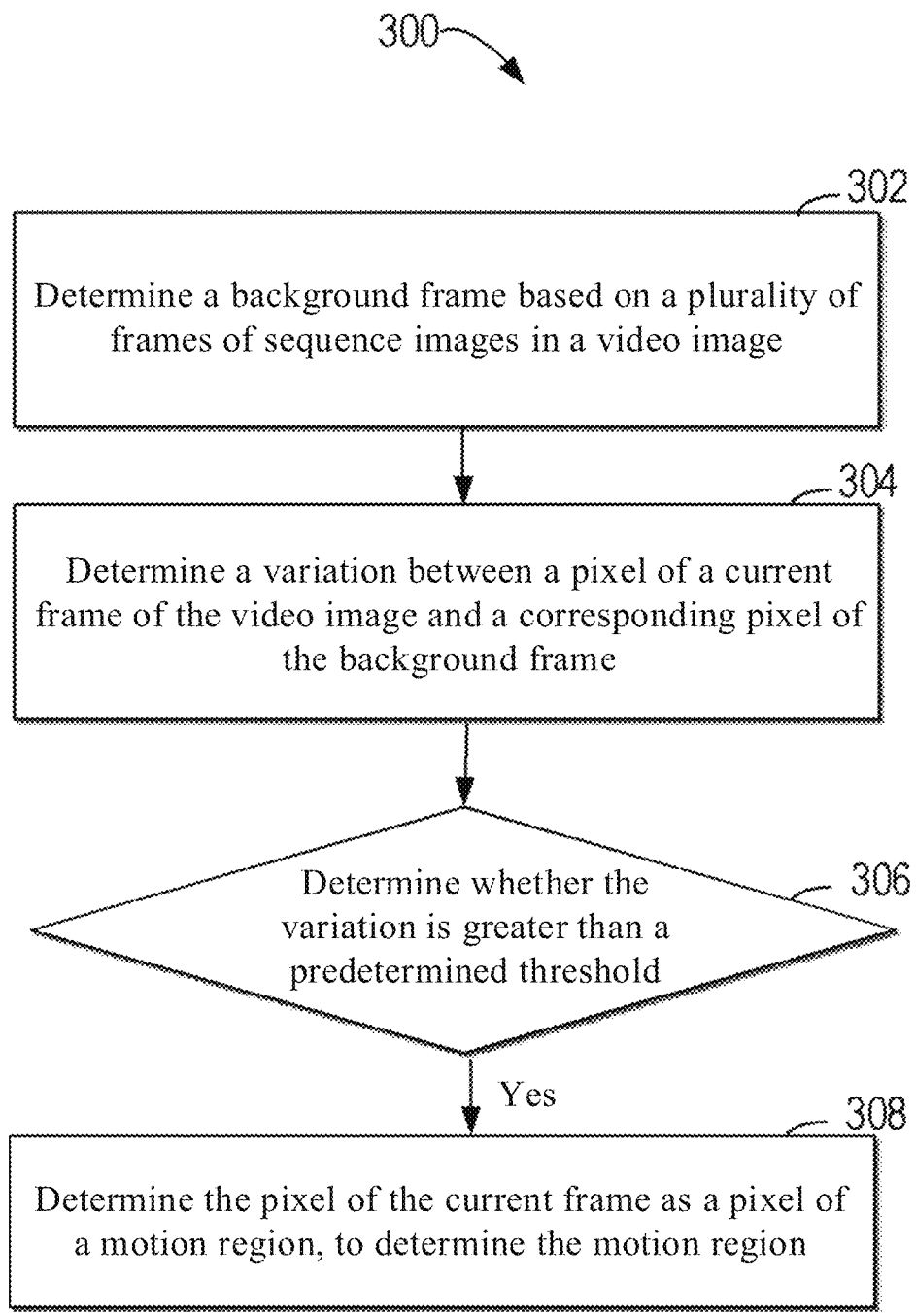
FIG. 3 is a flowchart of a method 300 for determining that a photographed region includes smoke according to an embodiment of the present disclosure.

FIG. 3 is a flowchart of a method 300 for determining a motion region according to an embodiment of the present disclosure. In FIG. 3, each action is, for example, performed by the calculation apparatus 120 in the system 100 for smoke alarm in FIG. 1. It should be understood that the method 300 may further include additional actions that is not shown and/or the shown actions may be omitted, and the scope of the present disclosure is not limited in this aspect.

In a block 302, a calculation apparatus 120 determines a background frame based on a plurality of frames of images in a video image. In some embodiments, the background frame is, for example, determined based on an average value of the plurality of frames of images in the video image obtained within a predetermined period of time. In the solution, the average value of the plurality of frames of images within the predetermined period of time may be calculated, to filter out motion objects that do not appear frequently. For example, a photographed region is a gangway of a building. People sometimes walk by or light is irradiated on the gangway. No one passes through the gangway for most of the time, or most of the objects in the gangway are still for most of the time. An average value of sequence image frames of the gangway within a predetermined period of time (for example, 24 h) may be calculated, to generate a background frame of the gangway. In some embodiments, the calculation apparatus 120 may first calculate other statistical data such as an average mean difference, a standard deviation, and a mean-drift value of the image frames obtained within the predetermined period of time, and then determine the background frame based on the above statistical data.

In a block 304, the calculation apparatus 120 determines a variation between a pixel of a current frame of the video image and a corresponding pixel of a background frame, for example, a variation of parameters of the pixel. The variation may indicate that there is a motion object. The motion object is, for example, people walking by the gangway or smoke 152 generated at the ignition point 150.

In a block 306, the calculation apparatus 120 determines whether the variation is greater than a predetermined threshold. The predetermined threshold may be preset.

In a block 306, the pixel of the current frame is determined as a pixel of a motion region in response to determining that the variation is greater than the predetermined threshold, to determine the motion region.

In the solution, a motion region can be determined based on a variation between a current image frame and a background frame, to effectively determine the motion region. The background frame is determined based on statistical data (for example, an average value) of a plurality of frames of images within a predetermined period of time, such that the interference of a motion object that appears sometimes to a pixel of the background frame can be avoided. Further, the accuracy of recognizing the motion region is improved.

Figure 4:
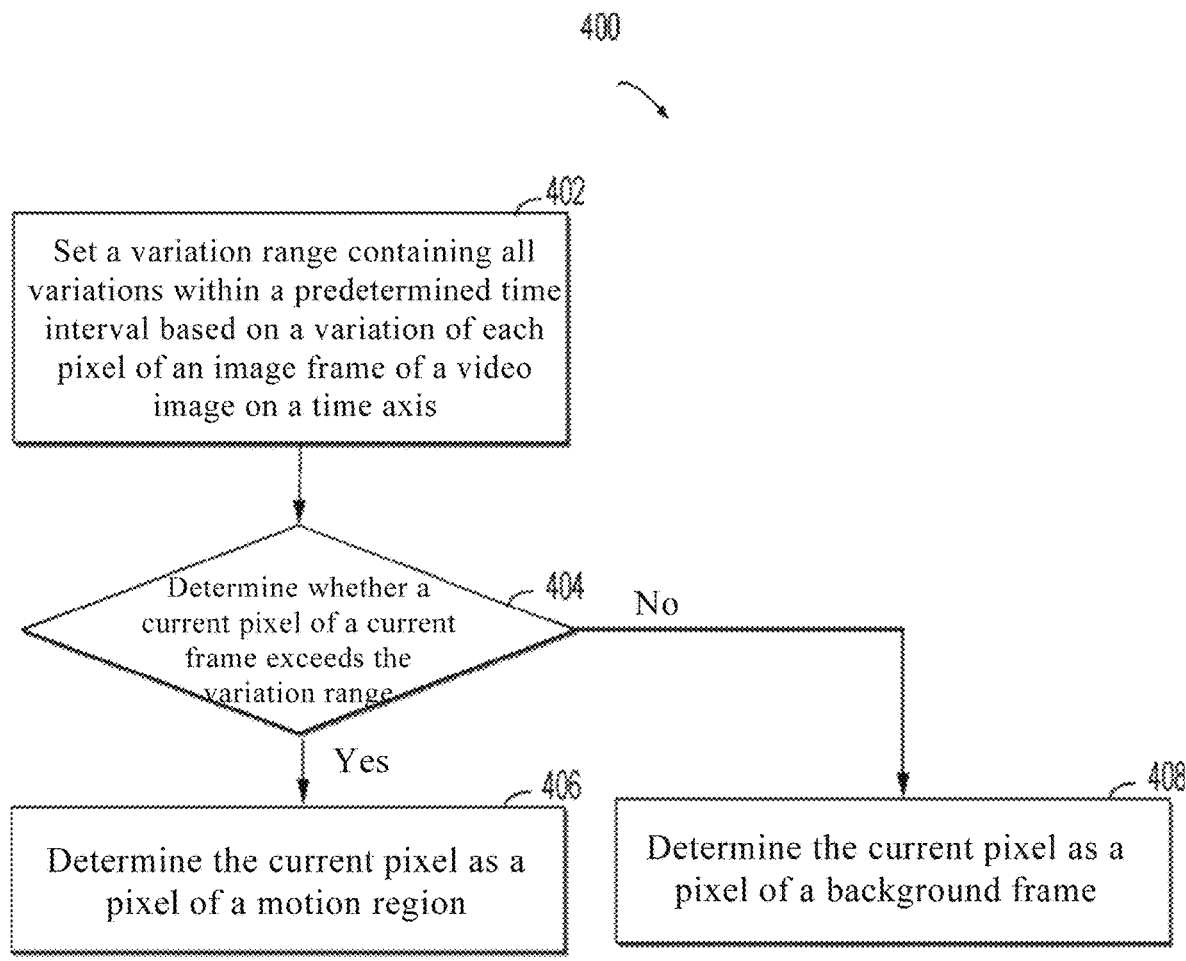
FIG. 4 is a flowchart of a method 400 for determining a motion region according to an embodiment of the present disclosure.

A method 400 for determining a motion region by using a code book-based on background model is described below with reference to FIG. 4. FIG. 4 is a flowchart of a method 400 for determining a motion region according to an embodiment of the present disclosure. In FIG. 4, each action is, for example, performed by the calculation apparatus 120 in the system 100 for smoke alarm in FIG. 1. It should be understood that the method 400 may further include additional actions that is not shown and/or the shown actions may be omitted, and the scope of the present disclosure is not limited in this aspect.

In a block 402, a calculation apparatus 120 sets a variation range containing all variations within a predetermined time interval based on a variation of each pixel of an image frame of a video image on a time axis. In a block 404, whether a current pixel of a current frame exceeds the variation range is determined. In a block 406, the current pixel is determined as a pixel of a motion region in response to determining that the current pixel of the current frame exceeds the corresponding variation range. In a block 408, the current pixel is determined as a pixel of a background frame in response to determining that the current pixel of the current frame does not exceed the corresponding variation range.

In some embodiments, the calculation apparatus 120 may further determine the motion region by using a Gaussian distribution-based background model. In a Gaussian model, color information between pixels is not related to each other, and processing for each pixel is independent of each other. For each pixel of a video image, a change of a value in a sequence image frame may be considered as a random process of constantly generating pixel values, that is, Gaussian distribution is used to describe a color presentation law of each pixel. For example, the calculation apparatus 120 may determine the motion region based on a single Gaussian model or a mixed Gaussian model.

In some embodiments, the calculation apparatus 120 may determine the motion region by using the single Gaussian model. For example, a color value of each pixel of an image frame is considered as a random process, and it is assumed that a probability of occurrence of a pixel value of the pixel follows the Gaussian distribution. A pixel value of each pixel of a background frame meets the following formula (1).

$$\frac{1}{\sqrt{2\pi}\delta}e^{-\frac{(G(x,y)-B(x,y))^2}{2\delta^2}} > T \qquad (1)$$

In formula (1), G(x, y) represents a pixel value of a pixel (x, y) in a current image frame G. δ represent a variance of Gaussian distribution of the pixel, and B(x, y) represents an average value of the Gaussian distribution of the pixel. T represents a predetermined constant threshold. (x, y) represents each pixel of the current image frame. In some embodiments, when the calculation apparatus 120 determines whether a pixel of a current image frame is a pixel of a motion region or a pixel of a background frame, if it is determined that a pixel value of the pixel is greater than T, it is determined that the pixel is the pixel of the background frame, and otherwise, it is determined that the pixel is the pixel of the motion region.

In some embodiments, the calculation apparatus 120 may update the background frame according to the following formula (2).

$$B_t(x,y)=p*B_{t-1}(x,y)+(1-p)*G_t(x,y) \qquad (2)$$

In formula (2), G(x, y) represents a pixel value of the pixel at a moment t. $B_t(x, y)$ represents an average value of Gaussian distribution of the pixel at the moment t. $B_{t-1}(x, y)$ represents an average value of Gaussian distribution of the pixel at a moment t−1. P is a constant and is used for reflecting a background update rate. A larger P indicates that the background is updated slower. A manner of determining a motion region based on single Gaussian background modeling is applicable to a photographed region with small change and slow change characteristics.

In some embodiments, the calculation apparatus 120 may determine the motion region based on a mixed Gaussian model. The mixed Gaussian model is a development of the single Gaussian model. The mixed Gaussian model is a model that uses a plurality of Gaussian models as a pixel position, such that the model has the robustness in a multimodal background.

Figure 5:
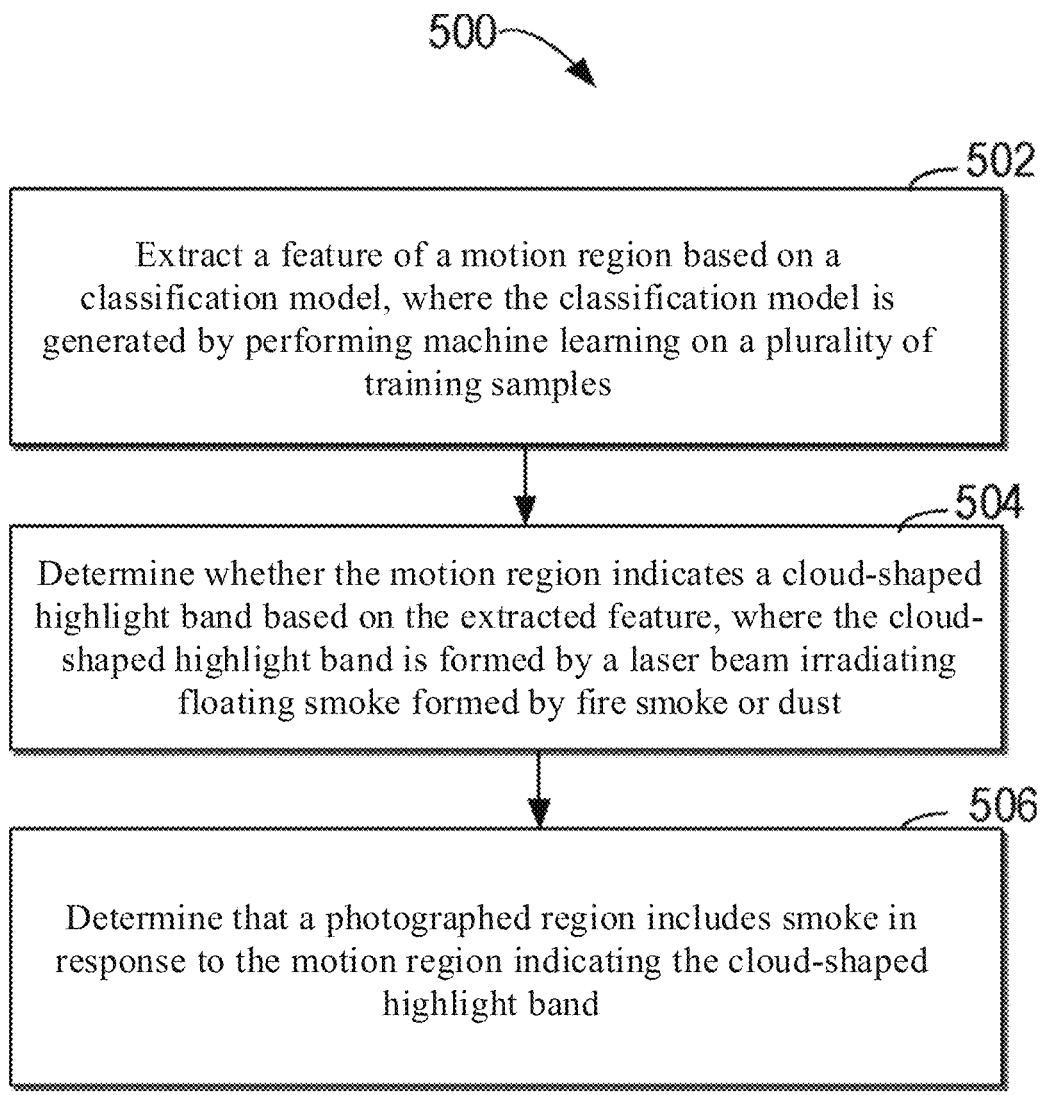
FIG. 5 is a flowchart of a method 500 for determining that a photographed region includes smoke according to an embodiment of the present disclosure.

A manner of determining whether a photographed region includes smoke based on deep learning classification is described below with reference to FIG. 5. FIG. 5 is a flowchart of a method 500 for determining that a photographed region includes smoke according to an embodiment of the present disclosure. In FIG. 5, each action is, for example, performed by the calculation apparatus 120 in the system 100 for smoke alarm in FIG. 1. It should be understood that the method 500 may further include additional actions that is not shown and/or the shown actions may be omitted, and the scope of the present disclosure is not limited in this aspect.

In a block 502, a calculation apparatus 120 may extract a feature of a motion region based on a classification model, where the classification model is generated by performing machine learning on a plurality of training samples. For a manner of generating a plurality of training samples, in some embodiments, the calculation apparatus 120 may clip a plurality of frames of images including the motion region based on a position of the motion region, to generate a plurality of motion object images associated with the motion region, and generate, based on the plurality of motion object images, a plurality of training samples for training a classification model.

In a block 504, the calculation apparatus 120 determines whether the motion region indicates a cloud-shaped highlight band based on the extracted feature, where the cloud-shaped highlight band is formed by a laser beam irradiating floating smoke formed by fire smoke or dust.

In a block 506, it is determined that a photographed region includes smoke in response to the motion region indicating the cloud-shaped highlight band.

In some embodiments, the calculation apparatus 120 may determine whether the photographed region includes smoke based on the classification model established based on a deep residual network structure ResNet 50 or ResNet 101. Therefore, the impact caused by the low accuracy of a training set with the deepening of a network is reduced.

Figure 6:
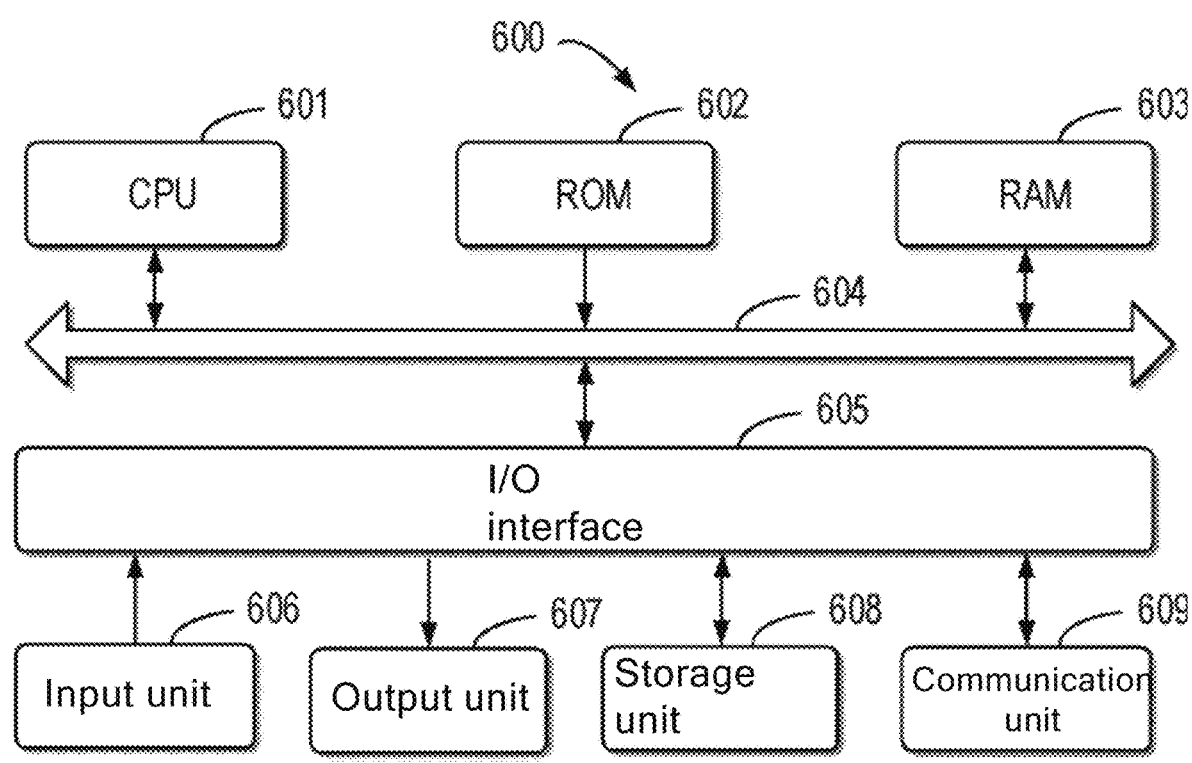
FIG. 6 is a block diagram of an electronic device 600 applicable to implement an embodiment of the present disclosure.

FIG. 6 is a block diagram of an electronic device 600 applicable to implement an embodiment of the present disclosure. The device 600 may be configured to implement the calculation apparatus 120 in FIG. 1 As shown in the figure, the system 600 includes a central processing unit (CPU) 601, which can perform various suitable actions and processing according to a computer program instruction stored in a read-only memory (ROM) 602 or a computer program instruction loaded from a storage unit 608 to a random access memory (RAM) 603, to perform various suitable actions and processing. The RAM 603 may further store various programs and data required for operations of the device 600. The CPU 601, the ROM 602, and the RAM 603 are mutually connected through a bus 604. An input/output (I/O) interface 605 is also connected to the bus 604.

A plurality of components in the device 600 are connected to the I/O interface 605, including: an input unit 606 such as a keyboard and a mouse; an output unit 607 such as various types of displays and speakers; a storage unit 608 such as a magnetic disk and an optical disk; and a communication unit 609 such as a network card, a modem, and a wireless communication transceiver. The communication unit 609 allows the device 600 to exchange information/data with another device by using a computer network such as the Internet and/or various telecommunication networks.

The processing unit 601 performs various methods and processing described above, for example, performing the methods 200, 300, 400, and 500. For example, in some embodiments, the methods 200, 300, and 400 may be implemented as a computer software program, which is stored in a machine-readable medium such as the storage unit 608. In some embodiments, all or a part of the computer program may be loaded by using the ROM 602 and/or the communication unit 609 and/or installed on the device 600. When being loaded to the RAM 603 and is executed by the CPU 601, the computer program may perform one or more operations of the methods 200, 300, 400, and 500 described above. Alternatively, in another embodiment, the CPU 601 may be configured to perform one or more actions of the methods 200, 300, 400, and 500 in any suitable manner (for example, by means of firmware).

The present disclosure may a method, an apparatus, a system, and/or a computer program product. The computer program product may include a computer-readable storage medium loading computer-readable program instructions for implementing various aspects of the present disclosure.

The computer-readable storage medium may be a tangible device that can hold and store instructions used by an instruction execution device. The computer-readable storage medium may be, for example, but not limited to, an electrical storage device, a magnetic storage device, an optical storage device, an electromagnetic storage device, a semiconductor storage device, or any suitable combination of the foregoing devices. More specific examples (non-exhaustive list) of the computer-readable storage medium include: a portable computer disk, a hard disk, a random access memory (RAM), a read-only memory (ROM), an erasable programmable ROM (EPROM), a flash memory, a static RAM (SRAM), a compact disc ROM (CD-ROM), a digital versatile disc (DVD), a memory stick, a floppy disk, and a mechanical encoding device such as a protruding structure that stores an instruction in a hole card or a groove, and any suitable combination of the foregoing. The computer-readable storage medium herein is not interpreted as a transient signal, such as radio waves or other freely propagating electromagnetic waves, electromagnetic waves propagating through waveguides or other transmission media (for example, light pulses through fiber optic cables), or electrical signals propagating through wires.

The computer-readable program instructions described herein can be downloaded from the computer-readable storage medium to various computing/processing devices, or downloaded to an external computer or external storage device over a network, such as the Internet, a local area network, a wide area network, and/or a wireless network. The network may include a copper transmission cable, optical fiber transmission, wireless transmission, a router, a firewall, a switch, a gateway computer, and/or an edge server. The network adapter card or network interface in each computing/processing device receives the computer-readable program instructions from the network, and forwards the computer-readable program instructions for storage in the computer-readable storage medium in each computing/processing device.

The computer program instructions used to perform the operations of the present disclosure may be assembly instructions, instruction set architecture (ISA) instructions, machine instructions, machine-related instructions, microcode, firmware instructions, state setting data, or source code or target code written in any combination of one or more programming languages. The programming languages include object-oriented programming languages such as Smalltalk and C++, and conventional procedural programming languages such as C language or similar programming languages. The computer-readable program instructions can be executed fully on a user computer, executed partially on a user computer, executed as an independent software package, executed partially on a user computer and partially on a remote computer, or executed fully on a remote computer or a server. In a circumstance in which a remote computer is involved, the remote computer may be connected to a user computer over any type of network, including a local area network (LAN) or a wide area network (WAN), or may be connected to an external computer (for example, connected over the Internet by using an Internet service provider). In some embodiments, an electronic circuit, such as a programmable logic circuit, a field programmable gate array (FPGA), or a programmable logic array (PLA), can be customized by using status information of the computer-readable program instructions. The computer-readable program instructions are executed to implement various aspects of the present disclosure.

Various aspects of the present disclosure are described with reference to flowcharts and/or block diagrams of methods, devices (systems), and computer program products according to embodiments of the present disclosure. It should be understood that each block of the flowcharts and/or block diagrams, and combinations of blocks in the flowcharts and/or block diagrams, can be implemented by computer-readable program instructions.

The computer-readable program instructions can be provided to a processor of a general-purpose computer, a dedicated computer, or other programmable data processing device, to produce a machine that makes the instructions when executed by the processor of the computer or other programmable data processing devices to implement the functions/actions specified in one or more blocks in the flowcharts and/or block diagrams. The computer-readable program instructions may be stored in a computer-readable storage medium. These instructions make computers, programmable data processing apparatuses, and/or other devices work in a specific manner. The computer-readable medium storing the instructions includes an artifact, which includes instructions for implementing various aspects of the functions/actions specified in one or more blocks in the flowcharts and/or block diagrams.

The computer-readable program instructions may be loaded onto a computer, another programmable data processing apparatus, or another device, such that a series of steps are executed on the computer, another programmable data processing apparatus, or another equipment to produce a computer-implemented process. In this way, the instructions executed on the computer, another programmable data processing apparatus, or another device implement the functions/actions specified in one or more blocks in the flowcharts and/or block diagrams.

The flowcharts and block diagrams in the accompanying drawings illustrate system architectures, functions and operations that may be implemented by the system, method, and computer program product according to the embodiments of the present disclosure. Each block in the flowcharts or block diagrams may represent a module, a program segment, or a part of instruction, and the module, the program segment, or the part of instruction contains one or more executable instructions used to implement specified logical functions. It should also be noted that, in some alternative implementations, functions marked in the blocks may also take place in an order different from the order marked in the accompanying drawings. For example, two consecutive blocks can actually be executed in parallel, or sometimes can be executed in the reverse order, depending on the functions involved. It should also be noted that each block in the flowcharts and/or block diagrams and combinations of the blocks in the flowcharts and/or block diagrams may be implemented by a dedicated hardware-based system for executing specified functions or operations, or may be implemented by a combination of dedicated hardware and computer instructions.

The embodiments of the present disclosure have been described above, and the above description is exemplary, not exhaustive, and is not limited to the disclosed embodiment. It is apparent to those skilled in the art that many modifications and changes may be made without departing from the scope and spirit of the described embodiments. The terms used herein are selected to best explain principles of the examples, practical applications, or improvements to technologies in the market, or to enable other persons of ordinary skill in the art to understand the embodiments disclosed herein.

The foregoing is merely optional embodiments of the present disclosure and is not intended to limit the present disclosure, and various changes and modifications can be made to the present disclosure by those skilled in the art. Any modifications, equivalent replacements, improvements, etc. made within the spirit and principle of the present disclosure shall be included within the protection scope of the present disclosure.

What is claimed is:

1. A method for determining smoke, comprising:
obtaining a video image of a photographed region by using a camera apparatus, wherein the photographed region is irradiated by a laser beam with a predetermined wave band emitted by a laser unit, and the camera apparatus is configured with a filter allowing the laser beam with the predetermined wave band to pass through;
determining, based on a plurality of frames of images in the video image, a motion region in the plurality of frames of images; and
determining whether the photographed region comprises smoke based on a feature of the motion region;
wherein the laser beam with the predetermined wave band is a pulse laser beam with a single wavelength, the single wavelength belongs to the predetermined wave band, a pulse frequency of the pulse laser beam is greater than a sampling frequency of the camera apparatus, and the filter is a narrow band filter, wherein a pass band center wavelength of the narrow band filter is the single wavelength.

2. The method according to claim 1, wherein the feature of the motion region is at least associated with a change of at least one of an edge contour and an area of the motion region.

3. A method for determining smoke, comprising:
obtaining a video image of a photographed region by using a camera apparatus, wherein the photographed region is irradiated by a laser beam with a predetermined wave band emitted by a laser unit, and the camera apparatus is configured with a filter allowing the laser beam with the predetermined wave band to pass through;

determining, based on a plurality of frames of images in the video image, a motion region in the plurality of frames of images; and determining whether the photographed region comprises smoke based on a feature of the motion region;

wherein the step of determining whether the photographed region comprises the smoke based on the feature of the motion region comprises:

extracting the feature of the motion region based on a classification model, wherein the classification model is generated by performing machine learning on a plurality of training samples;

determining whether the motion region indicates a cloud-shaped highlight band based on the feature of the motion region, wherein the cloud-shaped highlight band is formed by the laser beam irradiating floating smoke formed by fire smoke or dust; and determining that the photographed region comprises the smoke in response to the motion region indicating the cloud-shaped highlight band.

4. The method according to claim 2, wherein the step of determining whether the photographed region comprises the smoke based on the feature of the motion region comprises:

determining whether the determined motion region is associated with a cloud-shaped highlight band based on an edge contour feature of the motion region, wherein the cloud-shaped highlight band is formed by the laser beam irradiating floating smoke formed by fire smoke or dust, and the edge contour feature comprises at least one of the following:

a ratio of a circumference of the edge contour to the area surrounded by the edge contour; and a ratio of a length of the edge contour to a width of the edge contour.

5. The method according to claim 1, wherein a predetermined angle is formed between a direction from the camera apparatus to a predetermined position of the photographed region and a direction from the laser unit to the predetermined position of the photographed region, and the pulse laser beam has a predetermined divergence angle.

6. The method according to claim 1, wherein the laser beam is an infrared ray.

7. The method according to claim 1, wherein the step of determining the motion region in the plurality of frames of images comprises:

determining a background frame based on a plurality of frames of sequence images in the video image;

determining a variation between a pixel of a current frame of the video image and a corresponding pixel of the background frame;

determining whether the variation is greater than a predetermined threshold; and determining the pixel of the current frame as a pixel of the motion region in response to determining that the variation is greater than the predetermined threshold, to determine the motion region.

8. The method according to claim 7, wherein the background frame is determined based on an average value of the plurality of frames of sequence images in the video image obtained within a predetermined period of time.

9. The method according to claim 1, further comprising:

clipping a plurality of frames of images comprising the motion region based on a position of the motion region, to generate a plurality of motion object images associated with the motion region; and generating a plurality of training samples for training a classification model based on the plurality of motion object images.

10. The method according to claim 1, further comprising:

generating an alarm signal in response to determining that the photographed region comprises the smoke, such that an alarm apparatus gives an alarm.

11. The method according to claim 1, wherein the step of determining whether the photographed region comprises the smoke based on the feature of the motion region comprises at least one of the following:

calculating and counting a histogram of a gradient of the video image to form the feature of the motion region, to determine whether the photographed region comprises the smoke; or determining whether the photographed region comprises the smoke by using a support vector machine-based two-class classification model.

12. The method according to claim 1, wherein the step of determining the motion region in the plurality of frames of images comprises:

determining the motion region by using a Gaussian distribution-based background model.

13. An apparatus for determining smoke, comprising:

a memory, configured to store one or more programs; and a processing unit, coupled to the memory and configured to execute the one or more programs to allow the apparatus to perform steps of the method according to claim 1.

14. A non-transient computer-readable storage medium, storing machine-executable instructions, wherein the machine-executable instructions, when being executed, allow a machine to perform steps of the method according to claim 1.

15. A device for determining smoke, comprising:

a laser unit, configured to emit a laser beam with a predetermined wave band, to irradiate a photographed region;

a camera apparatus, configured to obtain a video image of the photographed region, wherein the camera apparatus is configured with a filter allowing the laser beam with the predetermined wave band to pass through; and a processing unit, configured to determine, based on a plurality of frames of images in the video image, a motion region in the plurality of frames of images, and determine whether the photographed region comprises smoke based on a feature of the motion region;

wherein the laser unit comprises:

a laser emitting source, configured to emit a pulse laser beam with a single wavelength, wherein the single wavelength belongs to a pass band of the filter, a pulse frequency of the pulse laser beam is greater than a sampling frequency of the camera apparatus, and the filter is a narrow band filter, wherein a pass band center wavelength of the narrow band filter is the single wavelength; and an optical element, configured to allow the pulse laser beam to be emitted at a predetermined divergence angle.

16. The device according to claim 15, wherein the feature comprises an edge contour feature of the motion region, and the edge contour feature comprises at least one of the following:

a ratio of a circumference of an edge contour to an area surrounded by the edge contour; and a ratio of a length of the edge contour to a width of the edge contour.

17. The device according to claim 15, wherein determining whether the photographed region comprises the smoke comprises:
- determining whether the motion region indicates a cloud-shaped highlight band based on an edge contour feature of the motion region, wherein the cloud-shaped highlight band is formed by the laser beam irradiating floating smoke formed by fire smoke or dust, and the laser beam is an infrared ray; and
- determining that the photographed region comprises the smoke in response to the motion region indicating the cloud-shaped highlight band.

18. The device according to claim 15, further comprising:
- an alarm apparatus, configured to give an alarm in response to detecting an alarm signal of the processing unit, wherein the alarm signal is generated by the processing unit in response to determining that the photographed region comprises the smoke.

\* \* \* \* \*